Aug. 14, 1956　　　　　G. W. NUNN　　　　　2,758,808
AUTOMATIC PARACHUTE RELEASE APPARATUS
Filed June 15, 1953　　　　　　　　　　　2 Sheets-Sheet 1
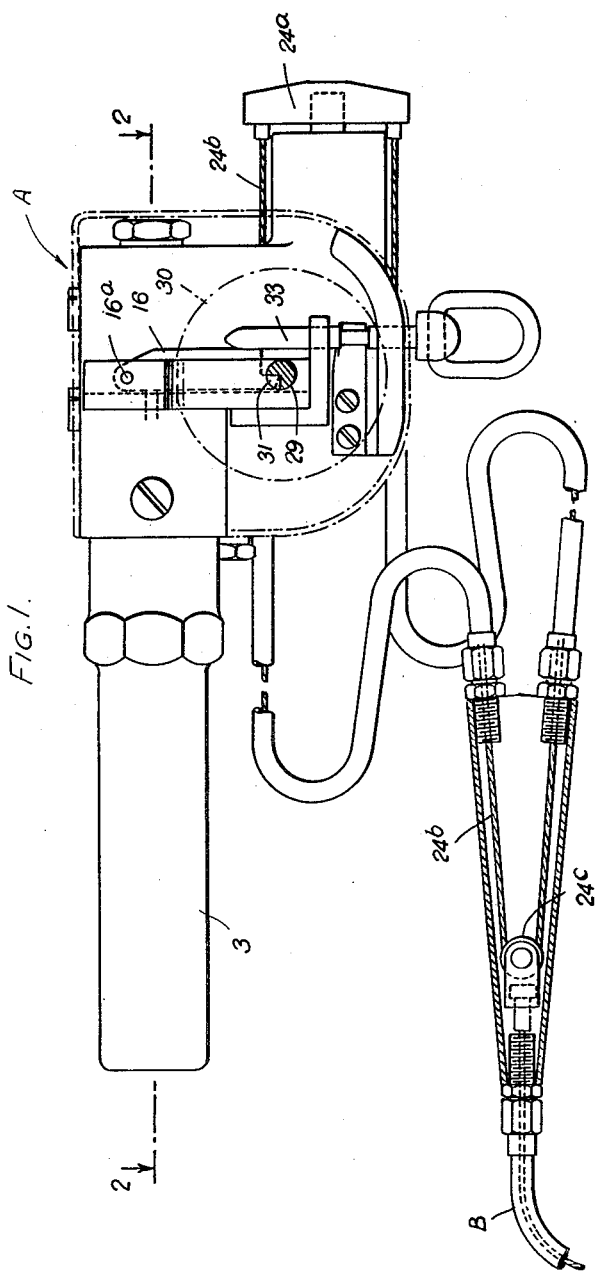
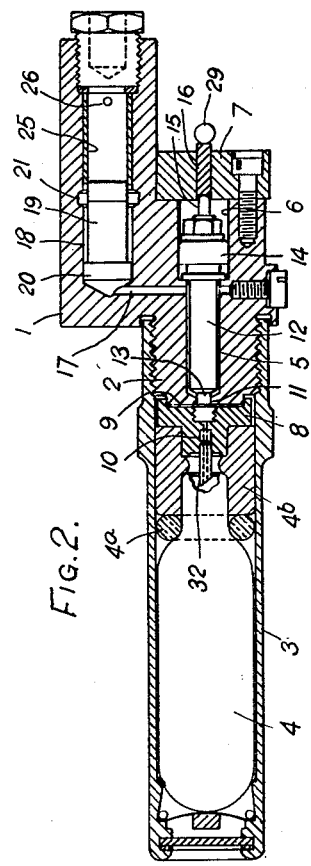
INVENTOR
G. W. NUNN
BY
Wilkinson & Mawhinney
ATTYS.

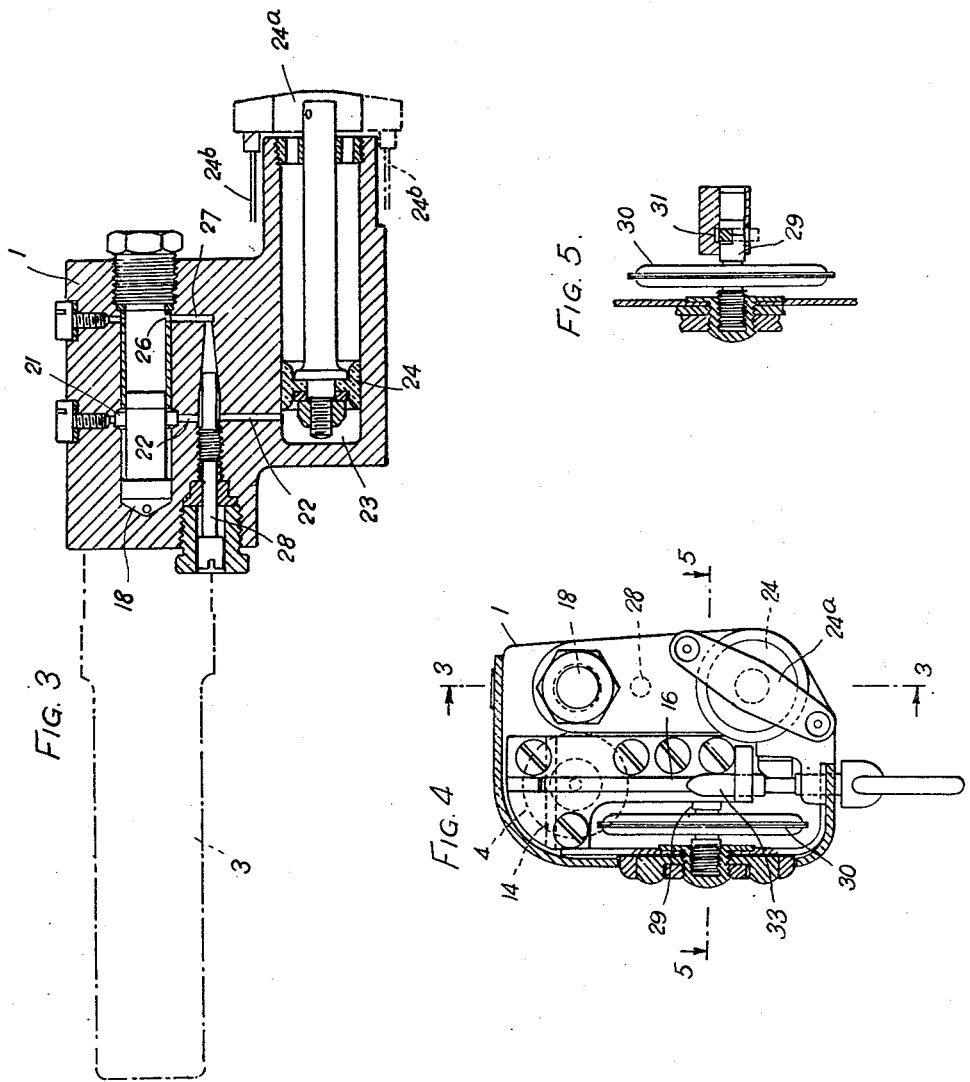

United States Patent Office 2,758,808
Patented Aug. 14, 1956

2,758,808

AUTOMATIC PARACHUTE RELEASE APPARATUS

George William Nunn, Ewell, England, assignor to Redwing Limited, Croydon, England, a British company Application June 15, 1953, Serial No. 361,771

9 Claims. (Cl. 244—150)

This invention relates to automatic parachute release apparatus adapted to control the opening of a parachute attached to a body or object released from an aircraft.

Release apparatus of this kind must be capable of being used not only with parachutes attached to fully conscious persons but unconscious persons or objects such as stores or equipment. The release must therefore be fully automatic in operation. It is desirable, however, that it should be capable of a slight delay in operation of say 3 second in all cases and a longer delay in other cases as for example when a person is released at a very high altitude e. g. 25,000 ft. or upwards. It is essential in the latter case that the person should have as rapid a descent as possible through the rarefied atmosphere at high altitude and that the opening of the parachute should accordingly be delayed until the person reaches an altitude where the atmosphere is breathable. The present invention provides apparatus which meets these requirements.

In application No. 17,514 of 1951 an automatic parachute release device is described which includes a piston reciprocably mounted in a cylinder and connected with the rip cord, a container having a supply of gas under pressure for actuating the piston to pull the rip cord, a pressure responsive device for controlling the release of said gas and means for regulating the flow of gas to said cylinder so that the interval of time between the release of the gas from the container and the pulling of the rip cord may be regulated.

When a sealed gas container is used as in the copending application the container is not punctured until the device is operated to pull the rip cord and accordingly it is impossible to check the condition of the container beforehand to determine whether it still holds sufficient gas under pressure to perform its allotted function. It is an object of the present invention to provide an improvement in or modification of the apparatus described in the co-pending application whereby means are provided which will enable the condition of the container and the pressure of the gas available therein to be readily checked at any time.

According to the present invention parachute release apparatus includes rip cord actuating means operable by gas under pressure, the apparatus including a compartment for housing a receptacle containing gas under pressure, means for opening the said receptacle when it is mounted in said compartment and pressure responsive means for controlling the flow of the gas to actuate the mechanism for effecting the operation of the parachute rip cord.

The invention will now be described with reference to the accompanying drawings, in which:

Fig. 1 is a side elevation of parachute release apparatus embodying one form of the invention;

Fig. 2 is a sectional plan view on the line 2—2 of Fig. 1;

Fig. 3 is a sectional elevation on line 3—3 of Fig. 4;

Fig. 4 is an end elevation partly in section; and

Fig. 5 is a fragmentary view of an aneroid capsule taken on the line 5—5 of Fig. 4.

As shown in the accompanying drawing the apparatus comprises a unit A adapted to be attached to the body harness of a parachute. The unit includes a body 1 having an extension 2 formed with external screw threads to which a housing 3 is attached, the housing being adapted to house the cylinder 4 containing gas under pressure.

The extension 3 of the body is formed as a cylindrical recess 5 opening into a similar recess 6 of slightly greater diameter, the outer end of which is closed by a plug 7. The plate or the like 8 is mounted adjacent to the end of the extension 2 and is adapted to clamp a diaphragm 9 of tin foil or like readily frangible material to the end of the extension. The plate 8 has an axial passage 10 in alignment with an aperture 11 leading into the recess 5 and the diaphragm 9 is adapted to form a gastight seal between the passage 10 and aperture 11.

A piston 12 is slidably mounted in the recess 5 and has a nose 13 adapted to extend into the aperture 11 to permit the free end of the nose to abut against the portion of the inner face of the diaphragm 9 which extends over the aperture 11 so that it is supported against inward movement and rupture when the piston 12 is in the position shown in Fig. 2. The piston 12 has an inner end portion 14 slidable in the recess 6 and provided with an adjustable stop 15 which, as shown in Fig. 2, is engaged by a lever 16 to hold the piston in its forward diaphragm supporting position. The lever 16 and the means for operating it will be described later. The arrangement is such that when the lever 16 is released the piston 12 will be free to slide inwardly away from the diaphragm 9.

The body 1 has a passage 17 providing a means of communication between the cylindrical recess 5 and a valve chamber 18 in which is mounted a slidable control valve 19 having an enlarged head 20. The chamber 18 is formed with an annular recess 21 communicating with a pasasge 22 which leads into a cylinder 23 housing an operating piston 24. A sleeve 25 is inserted in the chamber 18 to form a chamber portion of reduced diameter and a port 26 is drilled therein to form means of communication with a passage 27 which communicates with the cylinder 23 past an adjustable needle valve 28. The inner end of the valve 19 which is slidable in the sleeve 25 has a suitable packing washer to prevent the escape of fluid in the sleeve into the forward end of the chamber 18.

The apparatus is shown in Figs. 2 and 3 in the operative or pre-release position, the piston 12 being held in supporting position against the diaphragm 9 by the lever 16. This lever is pivoted at 16ᵃ and is normally held in the position shown by a sear 29, which is connected with an aneroid or barometric capsule 30, the sear having a slot or recess (as shown in Fig. 5) adapted to engage the nose 31 of the lever 16. The capsule 30 is so designed that when a predetermined barometric pressure corresponding to a predetermined height is reached, the capsule will collapse and withdraw the sear from the nose of the lever.

The apparatus is adapted to be operated by the pressure of gas issuing from the cylinder 4. This gas cylinder which may be of the type having a frangible closure mounted in its neck is assembled by removing the housing 3, inserting the cylinder so as to be supported by a neck ring 4ᵃ and a plug 4ᵇ and screwing the housing on to the extension 2. The plate 8 which is mounted adjacent to the diaphragm 9 is provided with a projecting hollow needle 32 extending in axial alignment with the passage 10, the needle being adapted to pierce the frangible cap of the gas cylinder when the housing is fully inserted into position. It will be understood that the parts are so arranged that the cap of the gas cylinder will not be pierced until the housing is secured in a gas tight manner to the extension of the body 1.

The gas from the cylinder 4 is permitted to flow through the needle 32 into the passage 10 to the adjacent outer face of the diaphragm. Its further flow is however blocked by the diaphragm and, although it will exert pressure on it, it cannot burst the diaphragm as the inner face is supported by the nose of the piston 12. The movement of the latter is however prevented by the sear 29 and by an additional locking sear 33, the latter being adapted to be attached to the static line in the aircraft.

In operation when a person or object leaves the aircraft the sear 33 is automatically withdrawn by the static line. The second sear 29 is, however, still held in operative position if the person or object happens to be above a predetermined height, for example 15,000 ft., and accordingly the person or object will fall freely without the parachute being opened until a height below 15,000 ft. is reached. When a height less than 15,000 ft. is reached the increased barometric pressure will cause the walls of the aneroid capsule to collapse to effect the withdrawal of the sear 29 from engagement with the nose of the lever 16. The pressure exerted on the diaphragm will cause the piston 12 to recede and leave the diaphragm unsupported on its inner side thereby permitting the pressure of the gas on the outer side to burst the diaphragm and provide a free passage for the gas to enter the aperture 13 and flow round the piston 12 into the passage 17 and the chamber 18. The gas now acts on the enlarged head 20 of the control valve 19 forcing it inwardly. This pressure is transmitted to fluid in the sleeve 25 and as the valve 19 is forced inwardly this fluid will be compressed and expelled through the port 26 into the passage 27 where it flows past the needle valve 28 into the cylinder 23 to actuate the operating piston 24. The piston 24 is connected with a cross head 24ª to which is attached the ends of a Bowden wire 24ᵇ adapted to exert a force on a pulley 24ᶜ to transmit a pull to a Bowden cable device B to actuate the rip cord of the parachute.

It will be understood that the flow of fluid to the cylinder 23 is controlled by the valve 19 and the needle valve 28 to ensure that a predetermined interval will elapse before there is a sufficient build up of pressure in operating the piston 24. This is essential to ensure that the parachute will be clear of the aircraft before it is opened even if the person or body leaves the aircraft at a height below 15,000 ft.

During the initial part of the stroke of the control valve 19 the fluid pressure is transmitted relatively slowly past the needle valve 28. When however the valve 19 is substantially at the end of its inward stroke the head 20 will uncover the annular recess 21 in the chamber 18 and the gas in the forward end of the chamber will be able to pass freely through the passage 22 and into the cylinder 23 by passing the needle valve 28. The cylinder 4 may contain argon or any other suitable inert gas, and it is an important feature of the present invention that the cylinder 4 is opened or punctured when it is fully assembled in position. The important advantage of this arrangement is that it is a relatively easy matter to check, for example by providing a pressure gauge on the unit, whether there is still sufficient gas under pressure available for operating the release mechanism. Accordingly a check can be made at any time and, of course, just before the parachute is to be used, whereas in former arrangements where the gas cylinder was sealed and not punctured until the parachute drop was made, it was never possible to be certain that the cylinder was sound and sufficiently full of gas under pressure.

It will be understood that the aneroid device may be adapted to operate at any desired height, the 15,000 ft. referred to being given merely by way of example.

The apparatus according to the present invention provides a release apparatus which is fully automatic at a predetermined altitude and yet provides for a certain degree of delayed action in all cases. Further it contains no parts which might be affected by centrifugal force set up should the person or object attached to the parachute be subject to spinning after leaving the aircraft.

The present invention further enables the opening of the parachute to be automatically effected at a predetermined height. In the case of stores or mail containers, the apparatus may be set to allow the objects to descend rapidly for any desired length of time before the fall is checked. This provides for increased accuracy in dropping articles on target areas from great heights. It further provides for a short delay in opening in all cases to obviate the possibility of the parachute opening too quickly and fouling other parts of the aircraft.

It will be understood that any suitable form of gauge or indicator may be provided so as to indicate the pressure of the gas therein.

I claim:

1. Apparatus for automatically operating the rip cord of a parachute pack comprising a housing, a compartment in said housing containing gas under pressure, means hermetically sealing said compartment including a frangible diaphragm, means supporting said diaphragm against rupture by the gas in the compartment, a cylinder in said housing, a plunger slidably mounted in said cylinder, means connecting said plunger with the parachute rip cord, conduit means connecting said compartment with said cylinder, and a pressure responsive device operable at a predetermined atmospheric pressure to effect the withdrawal of said supporting means to permit the gas under pressure in said compartment to rupture the diaphragm and flow to said cylinder to actuate said plunger and operate the rip cord.

2. Apparatus for automatically operating the rip cord of a parachute pack comprising a housing, a compartment in said housing, a receptacle containing gas under pressure located in said compartment the gas being free to flow from said receptacle into said compartment, means hermetically sealing said compartment including a frangible diaphragm, means supporting one face of said diaphragm against rupture by the gas in the compartment, a cylinder in said housing, a plunger slidable in said cylinder and connected with said parachute rip cord, conduit means connecting said compartment with said cylinder, a pressure responsive device operable at a predetermined atmospheric pressure to effect the withdrawal of said supporting means to permit the gas in said compartment to rupture the diaphragm and flow into said cylinder to actuate said plunger and operate the rip cord.

3. Apparatus for automatically operating the rip cord of a parachute pack comprising a housing, a compartment in said housing, a receptable containing gas under pressure located in said compartment the gas being free to flow from said receptacle into said compartment, means hermetically sealing said compartment including a frangible diaphragm, a slidably mounted member supporting one face of said diaphragm against rupture by the gas in the compartment, a stop holding said slidably mounted member in supporting relation to said diaphragm, a cylinder, a piston slidable in said cylinder and adapted for connection with said rip cord, conduit means connecting said compartment with said cylinder and a pressure responsive device operable at a predetermined atmospheric pressure to effect the withdrawal of said stop to permit the withdrawal of said slidably mounted member out of diaphragm supporting position to enable the gas in said compartment to rupture the diaphragm and flow to said cylinder and actuate said plunger to operate the rip cord.

4. Apparatus for automatically operating the rip cord of a parachute pack comprising a housing, a compartment in said housing, a receptacle having a frangible closure and containing gas under pressure located in said compartment, means hermetically sealing said compartment including a frangible diaphragm, a hollow needle mounted adjacent to one side of said diaphragm so as to pierce said frangible cap to allow the gas to flow to said diaphragm, means supporting the opposite face of said diaphragm against rupture by the said gas, a cylinder in said housing, a plunger slidable in said cylinder and connected with the parachute rip cord, conduit means connecting said compartment with said cylinder, a pressure responsive device operable at a predetermined atmospheric pressure to effect the withdrawal of said supporting means to permit the gas in said compartment to rupture the diaphragm and flow therethrough to said cylinder and actuate said plunger to operate the rip cord.

5. Apparatus for automatically operating the rip cord of a parachute pack comprising a housing, a compartment in said housing containing gas under pressure, means hermetically sealing said compartment including a frangible diaphragm, means supporting said diaphragm against rupture by the gas in the compartment, a cylinder in said housing, a plunger slidably mounted in said cylinder and connected with the parachute rip cord, conduit means connecting said compartment with said cylinder, a pressure responsive device operable at a predetermined atmospheric pressure to effect the withdrawal of said supporting means to permit the gas in said compartment to rupture the diaphragm and flow therethrough to said cylinder and actuate said plunger to operate the rip cord, and valve means for regulating the flow of said gas to the said cylinder to provide that the said plunger is actuated in delayed relation to the operation of the pressure responsive device.

6. Apparatus for automatically operating the rip cord of a parachute pack comprising a housing, a compartment in said housing, a receptacle containing gas under pressure located in said compartment the gas being free to flow from said receptacle into said compartment, means hermetically sealing said compartment including a frangible diaphragm, means supporting said diaphragm against rupture by the gas in the compartment, a cylinder, a plunger slidable in said cylinder and connected with the parachute rip cord, conduit means connecting said compartment with said cylinder, a pressure responsive device operable at a predetermined atmospheric pressure to effect the withdrawal of said supporting means to permit the gas in said compartment to rupture the diaphragm and flow therethrough to said cylinder and actuate said plunger to operate the rip cord, and valve means for regulating the flow of said gas to the said cylinder to provide that the said plunger is actuated in delayed relation to the operation of the pressure responsive device.

7. A gas pressure operated servo device comprising a housing including a compartment containing gas under pressure, a frangible diaphragm sealing said compartment, a displaceable support positioned in abutment with the diaphragm to support it against rupture by the gaseous pressure in the compartment, a cylinder, a piston slidably mounted in said cylinder, conduit means connecting said compartment with said cylinder, and pressure responsive means operable at a predetermined pressure to free said displaceable support to permit the movement of the latter away from the diaphragm to allow the gaseous pressure in the compartment to burst the diaphragm and flow through the said condit means to the cylinder to actuate said piston.

8. A gas pressure operated servo device comprising a housing including a compartment containing gas under pressure, a frangible diaphragm sealing said compartment, a slidable support rod positioned in abutment with the diaphragm to support it against rupture by the gaseous pressure in the compartment, releasable holding means retaining said rod in abutment with said diaphragm, a cylinder, a piston slidably mounted in said cylinder, conduit means connecting said compartment with said cylinder, and pressure responsive means operable at a predetermined pressure to release said holding means to free said rod to slide away from the diaphragm to allow the gaseous pressure in the compartment to burst the diaphragm and flow through the said conduit means to the cylinder to actuate said piston.

9. A gas pressure operated servo device comprising a housing including a compartment containing gas under pressure, a frangible diaphragm sealing said compartment, a displaceable support positioned in abutment with the diaphragm to support it against rupture by the gaseous pressure in the compartment, a cylinder, a piston slidably mounted in said cylinder, conduit means connecting said compartment with said cylinder, pressure responsive means operable at a predetermined pressure to free said displaceable support to permit the movement of the latter away from the diaphragm to allow the gaseous pressure in the compartment to burst the diaphragm and flow through the said conduit means to the cylinder to actuate said piston, and valve means for regulating the flow of said gas to said cylinder to provide that said piston is actuated in delayed relation to the operation of the pressure responsive means.

References Cited in the file of this patent

UNITED STATES PATENTS

| | | |
|---|---|---|
| 2,398,201 | Young | Apr. 9, 1946 |
| 2,437,991 | Baston | Mar. 16, 1948 |
| 2,470,457 | Bancora | May 17, 1949 |
| 2,618,292 | Ring | Nov. 18, 1952 |

FOREIGN PATENTS

| | | |
|---|---|---|
| 284,379 | Italy | Apr. 10, 1931 |
| 486,138 | Canada | Sept. 2, 1952 |
| 615,054 | Great Britain | Dec. 31, 1948 |